United States Patent [19]

Miller

[11] Patent Number: 4,865,270

[45] Date of Patent: Sep. 12, 1989

[54] PASSIVE ZERO-GRAVITY LEG RESTRAINT

[75] Inventor: Christopher R. Miller, Los Angeles, Calif.

[73] Assignee: The United States of America as represented by the Administrator of the National Aeronautics and Space Administration, Washington, D.C.

[21] Appl. No.: 254,052

[22] Filed: Oct. 6, 1988

[51] Int. Cl.$^4$ .............................................. B64G 1/60
[52] U.S. Cl. ............................ 244/118.5; 244/158 R; 244/162; 297/423; 272/145
[58] Field of Search ............ 244/122 R, 118.5, 118 C, 244/158 R, 162; 297/423, 195; 272/144, 145

[56] References Cited

U.S. PATENT DOCUMENTS

| | | | |
|---|---|---|---|
| 4,292,962 | 10/1981 | Krause | 272/145 |
| 4,506,930 | 3/1985 | Lambert | 297/423 |
| 4,508,335 | 4/1985 | Kelley et al. | 272/145 |

FOREIGN PATENT DOCUMENTS

| | | | |
|---|---|---|---|
| 2600542 | 12/1987 | France | 272/145 |
| 1347216 | 2/1974 | United Kingdom | 297/423 |

OTHER PUBLICATIONS

Palmgren, "Internal Fitting", International Publication Number WO87/01568, Mar. 26, 1987.

*Primary Examiner*—Barefoot Galen L.
*Attorney, Agent, or Firm*—Darrell G. Brekke; John R. Manning; Charles E. B. Glenn

[57] ABSTRACT

A passive zero or microgravity leg restraint (10) includes a central support post (17) with a top (12) and a bottom (20). Extending from the central support post (17) and calf pad tab (15), to which calf pad (16) is attached, and foot pad tab (19), to which foot pad (18) is attached. Also extending from central support post (17) are knee pads (13 and 14). When the restraint is in use the user's legs are forced between pads (13, 14, 16 and 18) by a user imposed scissors action of the legs. The user's body is then supported in a zero or microgravity neutral body posture by the leg restraint. Calf pad (16) has semi-rigid elastic padding material covering structural stiffener (26). Foot pad (18) has padding material (25) and structural stiffener (27). Knee pads (13 and 14) have structural tube stiffener (28) at their core.

17 Claims, 4 Drawing Sheets

PASSIVE ZERO-GRAVITY LEG RESTRAINT

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

TECHNICAL FIELD

This invention relates to body restraints for use aboard spacecraft providing a weightless interior environment. The restraint employs a wedge action friction fit against the lower leg and foot. This allows the user to transfer moment forces from upper body movement through the legs into the restraint and into the restraint's attachment surface.

BACKGROUND ART

Existing methods of zero-gravity body restraint are used aboard the NASA Space Shuttle. These primarily consist of strap type foot restraints, seat belts and shoulder harnesses, and sleeping bag type sleep restraints. Foot restraints consist of fabric loops positioned conveniently on "floor" surfaces in front of equipment and storage "wall" surfaces. Foot loops are an easy and quick means of restraint; however, they do not hold the body in a proper zero-gravity posture relative to equipment surfaces and are thus adequate only for short-term usage. Foot loops also require the use of handholds to stabilize the body while forcing the feet into the straps. Belts and harnesses are commonly used in conjunction with various seats aboard the Shuttle. They provide positive contact with surfaces of couches, waste management equipment, and health maintenance equipment. Though useful for tasks where positive contact with a seat or floor surface is needed, seat belts and shoulder harnesses have three disadvantages: (1) they must be adjusted by each crew member, (2) they must always be used in conjunction with a reactive surface such as a seat or floor, and (3) they can obstruct upper body movement. The Shuttle sleep restraints are designed specifically for sleeping and are not appropriate for normal crew activities.

Additional body restraints were explored aboard the NASA Skylab missions of the early 1970's, as described in Dalton, Maynard C., "Experience Bulletin No. 10: Body Restraint Systems," Man-Machine Engineering Data Application of Skylab Experiments M487/M516, NASA, December 1974. Notable among these were a thigh restraint designed for use with a wardroom table and a foot restraint involving the use of cleated shoes. The thigh restraint consisted of an adjustable metal clamp that actively grasped the thighs between contact points at the front and back of the leg. Optimally, this restraint was used in concert with a strap type foot restraint. This system of restraints failed to position Skylab astronauts correctly in relation to the wardroom table. Moreover, the restraint required adjustment of the clamp mechanism with each use. Ultimately, astronauts rejected the intended means of use and improvised easier, more comfortable means of use of the restraint, though even improvised techniques of restraint with the thigh restraint were not comfortable for long-term usage. When positive long-term restraint was needed, the astronauts relied on a cleated shoe and gridded floor foot restraining system. This involved the use of cleated shoes that inserted and twisted into an open triangular grid structure "floor" surface providing positive contact between the astronaut's shoes and the floor. The main disadvantage of this restraint system was that astronauts wore sturdy cleated shoes at all times. Also, sometimes the cleats were difficult to lock and unlock to and from the floor grid.

A variety of restraint systems not intended for zero or microgravity use are also known in the art. For example, U.S. Pat. No. 2,976,914, issued Mar. 28, 1961 to Miller, discloses Velcro fasteners for floor cushions in an aircraft cabin. U.S. Pat. No. 3,165,168, issued Jan. 12, 1965 to Rose, discloses a boatswain's chair waist restraint. U.S. Pat. No. 4,235,182, issued Nov. 25, 1980 to Bürger, discloses a chest, foot and hand restraint system for water skiing and windsurfing. U.S. Pat. No. 4,457,510, issued July 3, 1984 to Pertschuk, discloses the use of Velcro pads to hold the user's feet against a wall while exercising. U.S. Pat. No. 4,591,148, issued May 27, 1986 to Slater, discloses the use of Velcro pads with a clamp to hold the user's feet against a door while exercising. U.S. Pat. No. 4,637,629, issued Jan. 20, 1987 to Cummings, discloses a flexible torso restraint for aircraft crew members that allows body movement within a localized space.

Various seating devices of special configuration intended for use in a gravity environment are also known in the art. For example, protective seats for aircraft use are disclosed in U.S. Pat. Nos. 3,826,434, issued July 30, 1974 to Von Beckh and 4,359,200, issued Nov. 16, 1982 to Brevard et al. U.S. Pat. No. 3,669,493, issued June 13, 1972 discloses a chair having knee rests of the same general type as the commercially available Balans chair. All of these prior art structures are either unsuitable for use in a zero or microgravity environment or have significant disadvantages that make them less than a complete solution for body restraint in such an environment.

Overall, previous and existing restraints are overly dependent on active means of body attachment and adjustment. Sometimes they are cumbersome combinations of restraints such as foot straps and thigh restraints. At other times they require tedious manipulation of buckles, latches, and adjustment screws.

SUMMARY OF THE INVENTION

Accordingly, it is an object of the present invention to provide a simple to use restraint for a zero or microgravity environment that does not require the use of accessories such as special shoes or harnesses.

It is another object of this invention to provide a restraint for a zero or microgravity environment that uses a passive means of holding the body, thus eliminating the need for belts, snaps, buckles, or Velcro fasteners.

It is another object to provide a restraint for a zero or microgravity environment that is self-adjusting to fit and position body sizes ranging from the 5the percentile Japanese female to the 95th percentile white or black American male in a relaxed zero-gravity neutral body posture.

It is another object to provide a restraint for a zero or microgravity environment that positions these body sizes at approximately the same eye and arm level relative to the restraint's attachment surface.

It is another object to provide a restraint for a zero or microgravity environment that positions these body sizes in an attitude such that their zero-gravity line of sight is approximately parallel to the restraint's attachment surface.

It is another object to provide a restraint for a zero or microgravity environment that stabilizes the user's lower legs (knee to toe) while giving comfortable long-term restraint against both delicate and strenuous movement of the upper body.

It is still another object to provide a restraint for a zero or microgravity environment that is portable within a spacecraft.

These objects may be accomplished by providing a restraint for a zero or microgravity environment that is comprised of four pads which are positioned to contact the front of the user's legs at the knee, top of foot, and the back of the legs at the calf. When the user wishes to mount the restraint, the user's legs are brought between knee and calf pads on each side of the restraint's central support post. The top of the foot is placed under a foot pad. Then the legs are wedged into the gap between the knee and calf pads with a scissors movement toward the center of the restraint. The gap between the knee and calf pads narrows toward the center of the restraint and captures the lower legs within elastic padding. The pads are designed to raise or lower the user depending on the diameter of the user's lower leg. Thus, small users with small calves are raised up to the same approximate eye and arm level as larger users with larger calves. At the same time, the pads are positioned to align the user's eye level approximately parallel to the restraint's attachment surface (the floor).

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIG. 7 is a top view of the leg restraint illustrating critical dimensions in centimeters.

DETAILED DESCRIPTION OF THE INVENTION

Figures 2, 3, 4:
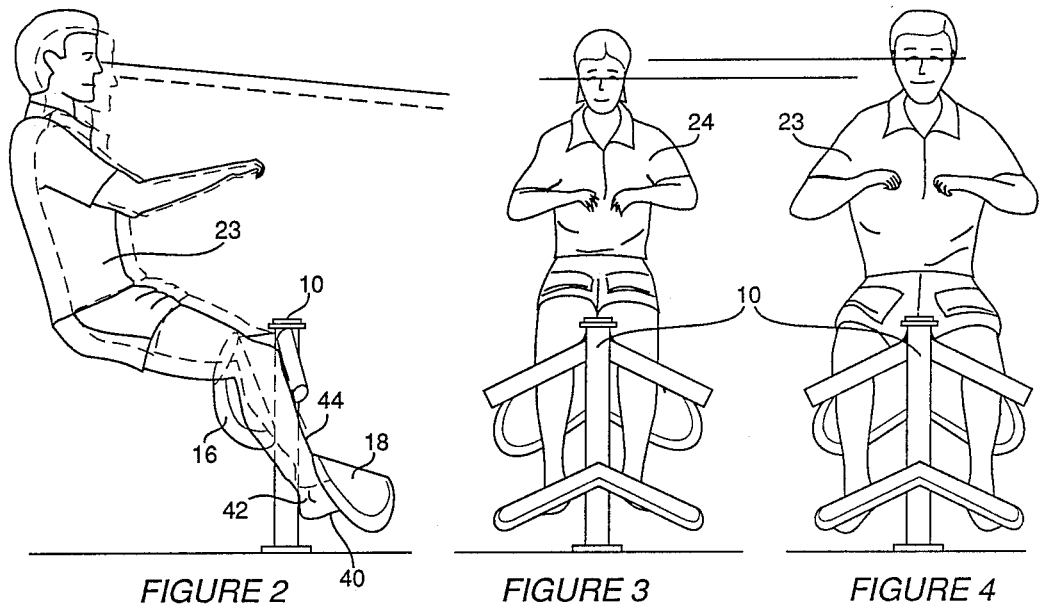
FIG. 2 is a side view of the leg restraint in use by a male of 50 percentile body size. A profile of a female of 50 percentile body size is shown in dashed line.
FIG. 3 is a front view of the leg restraint in use by a female of 50 percentile body size.
FIG. 4 is a front view of the leg restraint in use by a male of 50 percentile body size.
Figure 1:
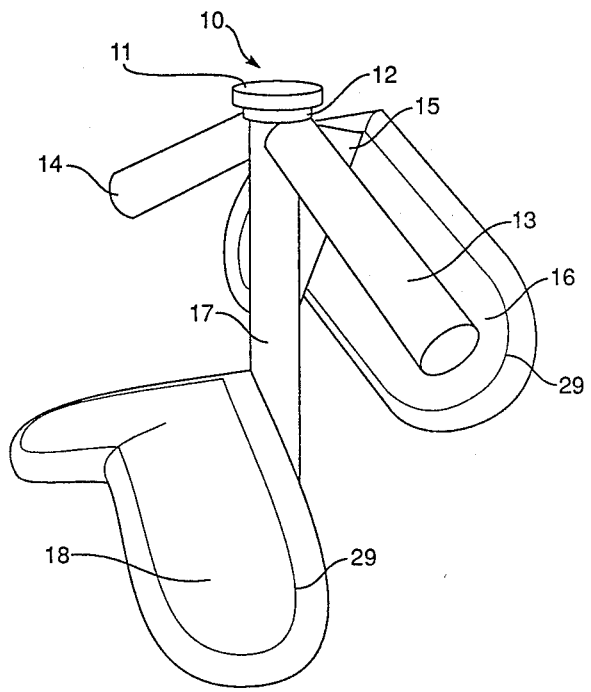
FIG. 1 is a perspective view of the leg restraint.

As seen in FIGS. 1, 5, 6 and 7, the passive zero-gravity leg restraint 10 includes a central support post 17 capped at its top end by post top 12 and capped at its bottom end by post bottom 20. At the top of the post is knob 11 connected to attachment bolt 21 which runs through the center of central support post 17 and out through post bottom 20. This is discussed in detail later.

Extending from the central support post 17 are calf pad tab 15, to which calf pad 16 is attached, and foot pad tab 19, to which foot pad 18 is attached. Also extending from central support post 17 are knee pads 13 and 14.

When the restraint is in use the user's legs are forced between pads 13, 14, 16 and 18 by a user imposed scissors action of the legs. A section through the pads, FIG. 8, reveals that calf pad 16 is comprised of semi-rigid elastic padding material 25 covering structural stiffener 26. The elastic padding material 25 is a suitable foamed plastic covered with an upholstery layer 29 where contact is made with the user's calves. Foot pad 18 has a similar construction consisting of padding material 25 covered with an upholstery layer 29 and structural stiffener 27. Knee pads 13 and 14 have padding material 25 and a structural tube stiffener 28 at their core. The padding material 25 could also be molded rubber. The structural members are made of a suitable metal or could be made of plastic.

FIGS. 2, 3 and 4 show the correct use of the restraint by a 50 percentile body size male 23 and female 24. A description of specific points of contact at the legs and foot of man 23 in FIG. 2 will demonstrate the ability of the restraint to overcome destabilizing forces applied to its user. Foot pad 18 contacts man 23's foot 40 along the top of the foot from a point just in front of ankle 42. Pad 18 is so situated as to flex the foot 40 down in relation to the shin 44. This action pulls the lower leg down such that calf pad 16 is forced against the back of the leg above the knee. Meanwhile, knee pad 14 fits tight against the top of the shin and calf pad 16 fits tight against the lower calf, forcing the foot to remain forward and under foot pad 18. Triangulation of contact points at the back of the knee, top of the shin, and top of the foot resists overturning moments which tend to force the user's body toward the back of the restraint. The coupling of contact points at the top of the shin and lower calf resists overturning moments which tend to force the user's body forward. Contact points at the top of the foot and at the back of the leg above the knee resist forces which vector directly into and out of the restraint on axis with the user. Similar triangulations, couplings, and direct resistance provide stability about all degrees of movement for the restraint user.

Figure 5:
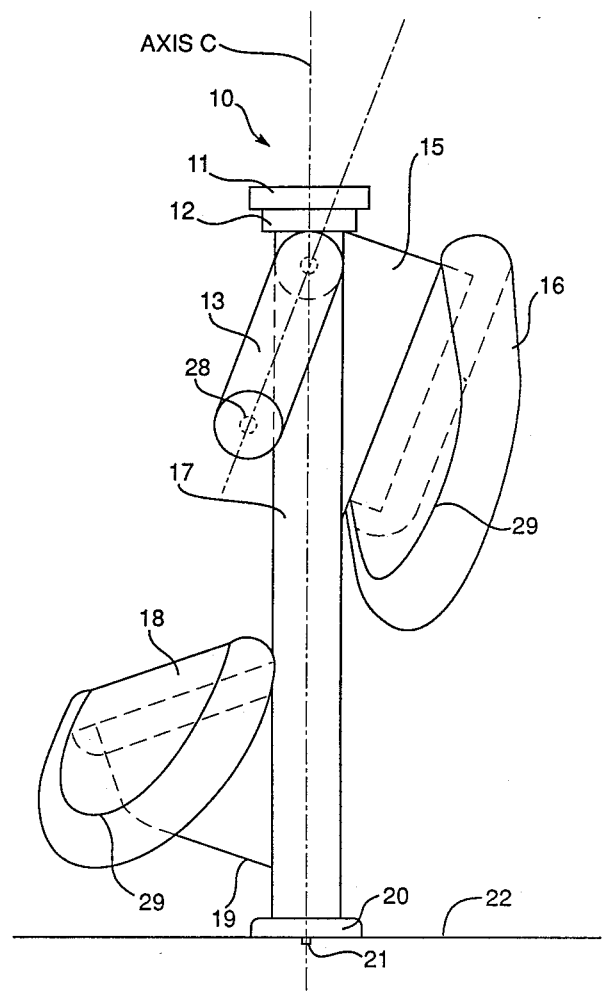
FIG. 5 is a side view of the leg restraint illustrating critical dimensions in centimeters.
Figure 6:
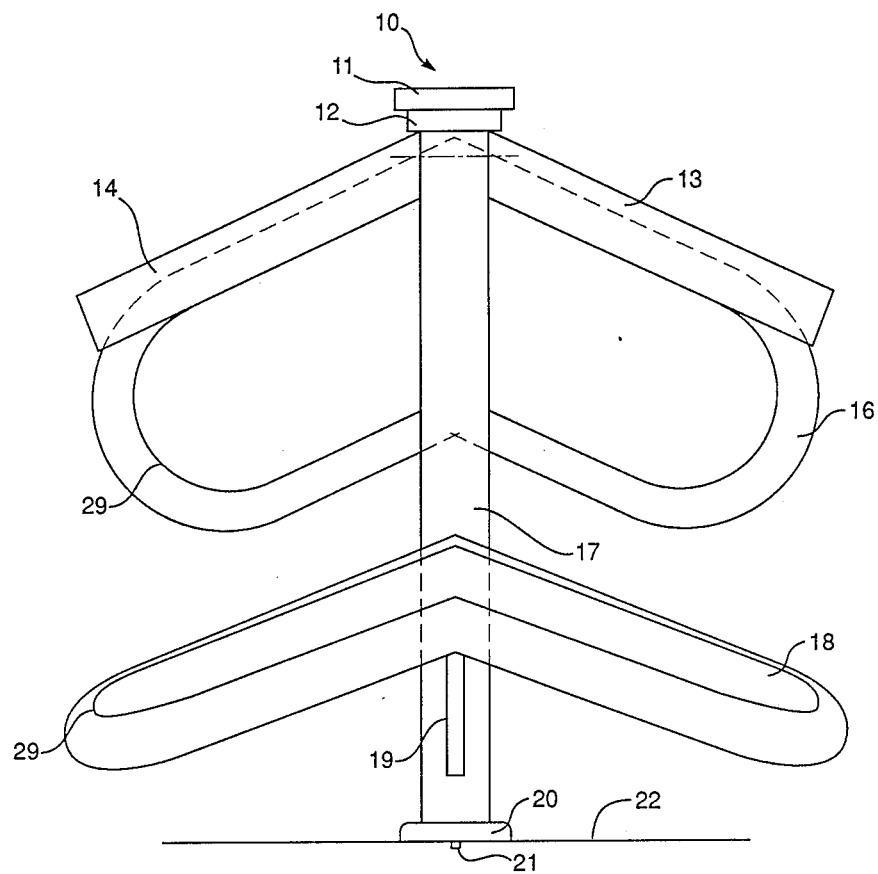
FIG. 6 is a front view of the leg restraint.

An examination of the shape of the pads and their relation to each other illustrates the self-adjustment aspects of the leg restraint. As seen in FIGS. 5 and 7, the distance between knee pad 13 and calf pad 16 increases as one moves from axis A (FIG. 7) along axis B to the extremities of the pads. These dimensions are established so that a 95 percentile American male leg will be captured near the extremity of the pad while a 5th percentile Japanese female leg will be captured near the central support post. As seen in FIGS. 5 and 6, knee pad 13 and calf pad 16 incline as one moves from their extremities toward axis A (FIG. 7). This dimension is established so that a 5th percentile Japanese female restrained at the center of the restraint is raised to approximately match eye and arm levels with a 95th percentile American male restrained lower at the extremities of the restraint. The distance between calf pad 16 and foot pad 18, seen in FIG. 5, varies as a product of the given dimensions as both pads incline toward axis A (FIG. 7). This allows for differences in the lower leg lengths between the 5th percentile female and 95 percentile male. As seen in FIG. 5, pads 13, 16 and 18 are positioned at established angles relative to axis C (FIG. 5). This allows the user's body to be positioned, while in a relaxed neutral body posture, with its zero-gravity line of sight approximately parallel to attachment surface 22.

Figure 8:
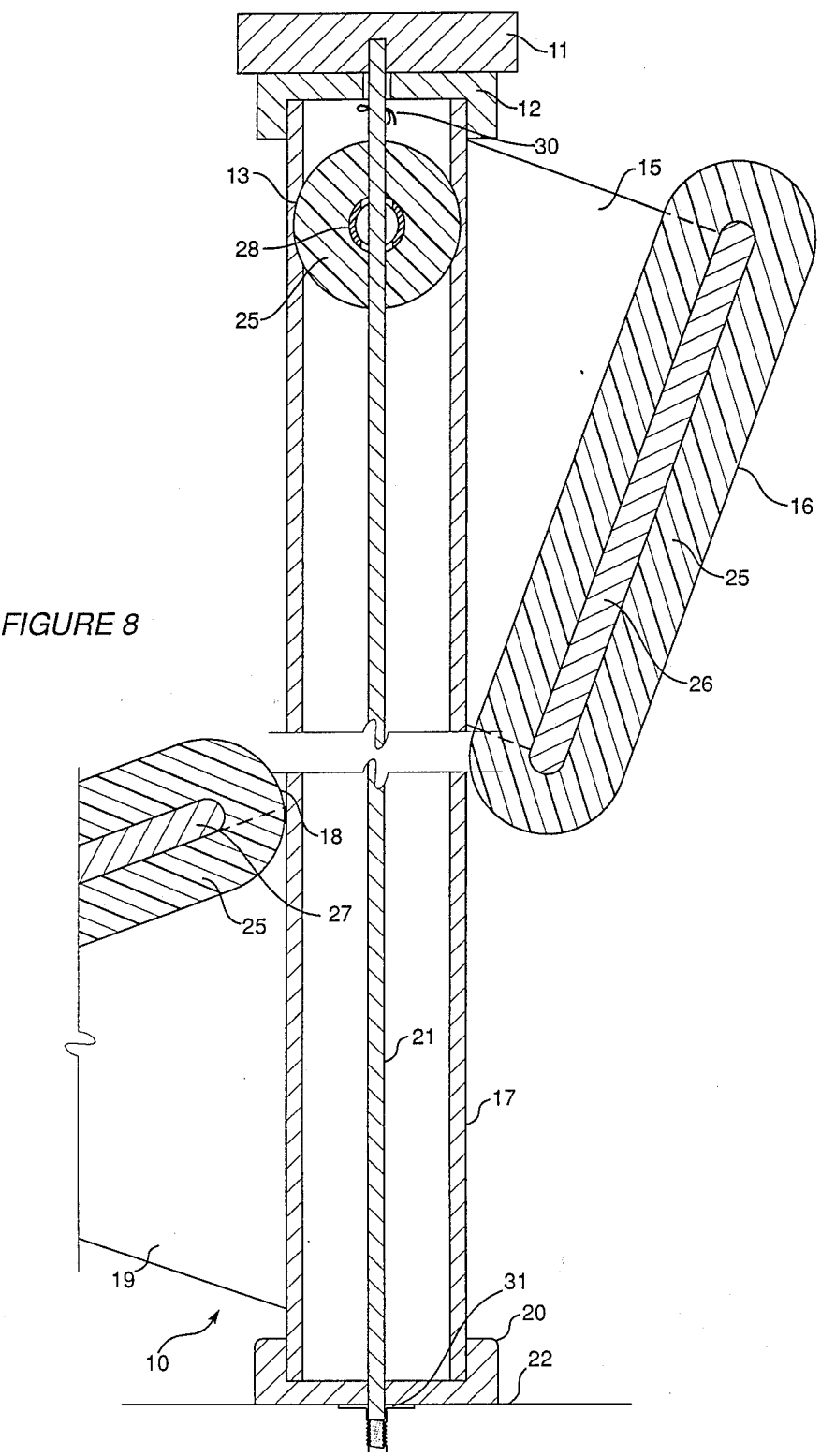
FIG. 8 is a longitudinal section through the leg restraint central support post, taken along the line 8—8 in FIG. 7, showing construction of the post and attachment bolt mechanism.

Attachment bolt 21 can be seen in FIG. 8. Knob 11 is connected to attachment bolt 21 which passes through post top 12, support post 17 and post bottom 20, where it screws into (by means of knob 11) a threaded hole 31 in attachment surface 22. Attachment bolt 21 is fixedly attached to knob 11 and held within central support post 17 by cotter pin 30 below post top 12. Post top 12 and post bottom 12 are permanently attached to the support post 12 by welding or a suitable adhesive. This construction allows the leg restraint 10 to be readily removed from the threaded hole 31 and installed on another threaded hole on another supporting surface.

It should now be readily apparent to those skilled in the art that a novel leg restraint capable of achieving the stated objects of the invention has been provided. The leg restraint does not require the use of accessories, such as special shoes or harnesses. The leg restraint eliminates the need for belts, snaps, buckles or Velcro fasteners for body restraint in a zero or microgravity environment. The leg restraint is self-adjusting to fit and restrain essentially all human body sizes. The leg restraint positions these body sizes at approximately the same eye and arm level relative to the restraint's attachment surface, with the user's line of sight approximately parallel to the attachment surface. The leg restrain stablizes the user's lower legs while giving comfortable restraint against both delicate and strenuous movement of the upper body. The leg restraint is portable within a spacecraft.

It should further be apparent to those skilled in the art that various changes in form and detail of the invention as shown and described may be made. It is intended that such changes be included within the spirit and scope of the claims appended hereto.

What is claimed is:

1. A leg restraint for a human body in a zero gravity or microgravity environment, which comprises a support, a foot pad fixedly attached to said support and having padding material on a lower surface thereof positioned to engage a top of a user's foot, a calf pad fixedly attached to said support and having padding material on an upper surface thereof, said calf pad being positioned relative to said foot pad to engage a back of a user's calf when the user's foot is positioned with the top of the user's foot engaging the lower surface of the foot pad, and a knee pad fixedly attached to said support and having padding material positioned to engage a front of the user's knee when the user's foot is positioned with the top of the user's foot engaging the lower surface of the foot pad and the user's calf is positioned with the back of the user's calf engaging the upper surface of said calf pad.

2. The leg restraint for a human body in a zero gravity or microgravity environment of claim 1 in which said support extends vertically and said foot pad, calf pad and knee pad extend laterally and downward at an inclined angle with respect to said support.

3. The leg restraint for a human body in a zero gravity or microgravity environment of claim 2 in which said leg restraint has left and right foot pads, calf pads and knee pads.

4. The leg restraint for a human body in a zero gravity or microgravity environment of claim 3 in which said left and right foot pads and said left and right calf pads are joined together at base ends proximate to said support.

5. The leg restraint for a human body in a zero gravity or microgravity environment of claim 4 in which said calf and knee pads cooperate to capture the lower legs of a 5th percentile Japanese female by means of contact with the top of the shin and the back of the calf in a position such that the female's legs are directly adjacent to said support and said calf and knee pads cooperate to capture the lower legs of a 95 percentile white or black American male in a position such that the male's legs are located near distal ends of said calf and knee pads.

6. The leg restraint for a human body in a zero gravity or microgravity environment of claim 5 in which said calf, knee and foot pads cooperate to ensure a tight fit to a 5th percentile Japanese female's and a 95 percentile white or black American male's back of leg above the knee and top of foot in front of the ankle.

7. The leg restraint for a human body in a zero gravity or microgravity environment of claim 6 in which said calf, knee and foot pads cooperate to raise the eye and arm level of a 5th percentile Japanese female to approximately the same eye and arm level as that of a 95th percentile white or black American male.

8. The leg restraint for a human body in a zero gravity or microgravity environment of claim 7 in which said calf, knee and foot pads cooperate to position all restraint users in a relaxed neutral body posture with a zero or microgravity line of sight approximately parallel to a surface to which said support is attached.

9. A leg restraint for a human body in a zero or microgravity environment comprising, in combination:
a central support post;
a means for fastening said central support post to an attachment surface;
a calf pad rigidly connected to said central support by a calf pad tab;
a foot pad rigidly connected to said central support post through a foot pad tab;
left and right knee pads rigidly connected to said central support post through a structural tube stiffener;
said calf pad and said foot pad comprising semi-rigid elastic padding material covering a structural stiffener;
said knee pads comprising a semi-rigid elastic padding material covering a structural tube stiffener.

10. The leg restraint of claim 9 in which said means for fastening said central support post comprises a knob adapted to be turned by hand from a top of said leg restraint to screw an attachment bolt into a threaded hole in an attachment surface.

11. The leg restraint for a human body in a zero gravity or microgravity environment of claim 9 in which said support post extends vertically and said foot pad, calf pad and knee pad extend laterally and downward at an inclined angle with respect to said support.

12. The leg restraint for a human body in a zero gravity or microgravity environment of claim 9 in which said foot pad and said calf pad have left and right portions.

13. The leg restraint for a human body in a zero gravity or microgravity environment of claim 9 in which said left and right foot pad portions and said left and right calf pad portions are joined together at base ends proximate to said support.

14. The leg restraint for a human body in a zero gravity or microgravity environment of claim 9 in which said calf and knee pads cooperate to capture the lower legs of a 5th percentile Japanese female by means of contact with the top of the shin and the back of the calf in a position such that the female's legs are directly adjacent to said support and said calf and knee pads cooperate to capture the lower legs of a 95 percentile white or black American male in a position such that the male's legs are located near distal ends of said calf and knee pads.

15. The leg restraint for a human body in a zero gravity or microgravity environment of claim 9 in which said calf, knee and foot pads cooperate to ensure a tight fit to a 5th percentile Japanese female's and a 95 percentile white or black American male's back of leg above the knee and top of foot in front of the ankle.

16. The leg restraint for a human body in a zero gravity or microgravity environment of claim 9 in which said calf, knee and foot pads cooperate to raise the eye and arm level of a 5th percentile Japanese female to approximately the same eye and arm level as that of a 95th percentile white or black American male.

17. The leg restraint for a human body in a zero gravity or microgravity environment of claim 9 in which said calf, knee and foot pads cooperate to position all restraint users in a relaxed neutral body posture with a zero or microgravity line of sight approximately parallel to a surface to which said support is attached.

* * * * *